July 27, 1937.  B. COLMAN  2,088,507
CAR LOADING DEVICE
Filed Dec. 28, 1935

INVENTOR
Ben Colman.
BY
Harness, Dickey, Pierce & Hann
ATTORNEYS.

Patented July 27, 1937

2,088,507

UNITED STATES PATENT OFFICE 2,088,507

CAR LOADING DEVICE

Ben Colman, Detroit, Mich., assignor to The Worth Company, a corporation of Michigan Application December 28, 1935, Serial No. 56,435

5 Claims. (Cl. 248—119)

This invention relates to loading devices and particularly to devices for anchoring automobiles in freight cars for transportation purposes.

An object of the invention is to provide a chain anchoring device of the type indicated which is of light construction, which is readily adapted for connection to automobile frame members of different sizes, and which is so designed that the chain pulling forces exert substantially pure tension stresses on all parts of the anchoring device.

Other objects and advantages of the invention will become apparent from the following specification and claims and the accompanying drawing.

For a better understanding of the invention reference may be had to the drawing forming a part of the specification wherein.

Figure 1:
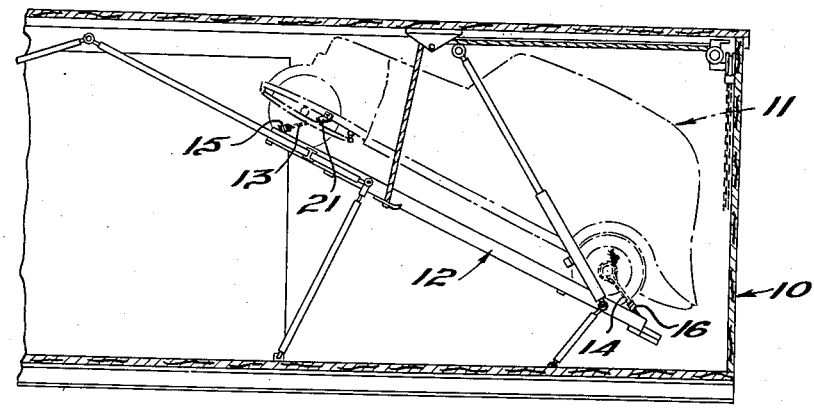
Figure 1 is a fragmentary cross-section of a freight car having an automobile anchored therein by means constructed in accordance with the present invention.

Referring to Fig. 1, a freight car 10 is shown in which there is supported an automobile 11 anchored upon a loading frame 12 by means of chains 13 and 14. The frame construction 12 and the means for elevating it and holding it in an inclined semi-decking position form no part of the present invention and are substantially the same as that structure disclosed in the co-pending application of Samuel D. Butterworth, Serial No. 646,830, filed December 12, 1932, now Patent No. 2,079,930 of May 11, 1937. While only one automobile is shown, it is the practice to anchor a second automobile on the floor of the freight car beneath the loading frame 12 by means of chains similar to the chains 13 and 14 utilized on the loading frame. The construction and operation of these chain connections are more fully set forth in the co-pending applications of Sulo M. Nampa, Serial No. 735,772, filed July 18, 1934, Serial No. 754,399, filed November 23, 1934, and Serial No. 755,077, filed November 28, 1934. It is to be noted here, however, that the chains contain spring sections 15 and 16, respectively, to permit a limited movement of the automobile upon the frame in the event of severe shock. These springs are relatively heavy, with the result that they permit only a very slight movement of the automobile with respect to the frame or the floor of the car, just enough to provide a slight cushioning action.

In accordance with the present invention, the chain for fastening an automobile either to the loading frame or the floor of the car is connected to the frame member 20 of the automobile. The advantages of such a connection, particularly where the automobile is provided with independently mounted wheels, are set forth in the co-pending application of Sulo N. Nampa, Serial No. 711,307, filed February 15, 1934, now Patent No. 2,073,349 of March 9, 1937, and the application of Ben Colman, Serial No. 714,599, filed March 8, 1934 now Patent No. 2,064,415 of December 15, 1936, which discloses means for this purpose.

All of the applications and patents referred to herein are assigned to the assignee of the present application.

Figure 2:
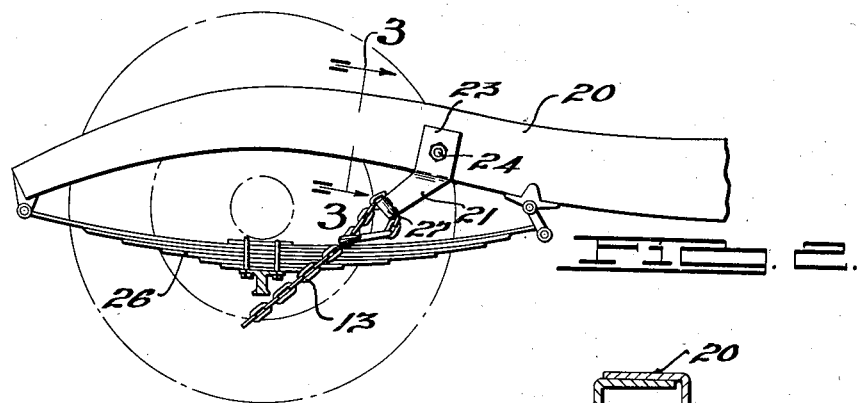
Fig. 2 is an enlarged view showing the manner in which the anchoring member is secured to the automobile frame.

In the present case the chain is connected to the automobile frame, as shown in Fig. 2, by means of a unitary sheet metal member having a generally V-shaped lower portion 21, the legs of which extend upwardly at 22 and 23 in parallel planes and embrace the frame member 20. The parallel upward extensions are secured to the frame by means of a bolt 24 passing through suitable openings in the extensions 22 and 23 and in the side walls of the frame member 20 and held in place by a nut 25. The anchor chain is then passed through the V-shaped loop to anchor the automobile in position.

Figure 3:
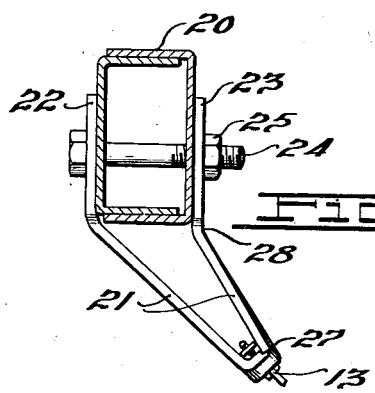
Fig. 3 is a cross-sectional view taken on the line 3—3 of Fig. 2.

In the form shown in Figs. 2 and 3, the lower or V-shaped portion of the device, through which the chain is looped, is deflected sideways to clear the spring 26 of the vehicle. This form is adapted for use on automobiles wherein the springs are positioned immediately beneath the longitudinal frame member.

Figure 4:
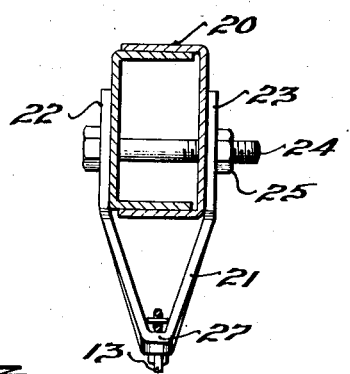
Fig. 4 is a cross-sectional view similar to Fig. 3 of a modified form of the anchoring means.

The same form may be used for anchoring automobiles wherein the springs are offset laterally with respect to the longitudinal frame members, but in this case the form of anchor shown in Fig. 4 may also be used. This form is similar to that shown in Fig. 3 except that the lower or V-portion extends directly below the frame member, instead of being deflected sideways as in Fig. 3.

In both forms the V-shaped lower portion 21 is deflected forwardly as shown in Fig. 2 in the line of the chain pull and the center line between the two arms of the V-portion also extends in the line of pull. In addition, the angle between the opposite sides of the V-portion 21 and the sharpness of the points 27 is so selected that when the chain is passed through the V- shaped loop it will wedge tightly between the opposite sides without bearing directly upon the bottom or point 27 of the V-portion 21.

It will be seen that there is provided a very simple anchoring device, the upper arms of which may be sprung apart or forced together to accommodate frame members of various sizes. Moreover, a very important characteristic of the anchor members shown resides in the fact that a pull on the chain, no matter how severe short of that required to break the anchor device apart by tension, will not exert any force on the anchor member which will tend to deform the device and thereby loosen the chain. This is due to two characteristics of the device, first, the fact that the sides of the V-shaped portion 21 are straight and make equal angles with and on opposite sides of the line of pull, and hence are subject to pure tension stresses, and, second, the fact that the chain wedges tightly between the sides of the V-portion, thereby tending to spread the sides of the V-portion apart and shorten the effective length of the anchor device rather than lengthen it.

It will be noted that there is a theoretical possibility that tension on the chain will cause a slight bending force on the right-hand leg of the V-shaped anchor member shown in Fig. 3. In practice, however, the angle of pull is so nearly in line with the angle of the upper portion 23 that the bending force is negligible. Should it be desired to use lighter weight sheet metal for the construction of the device, or in the event that extreme tension forces are anticipated, all possibility of bending stresses can be removed by shifting the location of bend 28 upwardly to a point immediately below the lower edge of the nut 25. This, however, will not ordinarily be necessary.

The anchoring device described above is exceedingly inexpensive to manufacture and easy to install and yet it provides a chain connection which will not permit any loosening of the anchor chain. This is important inasmuch as a relatively small amount of loosening will relieve the tension on the heavy springs 15 and 16 and will give rise to an undesirable freedom of movement on this part of the automobile.

What is claimed is:

1. An attaching member for securing a tension anchoring means to the frame of an automobile, comprising a sheet metal member having the end portions thereof extending in spaced parallel planes for embracing the frame and having the intermediate portions converging in substantially straight lines to form a V-shaped loop for the reception of a tension anchoring chain, the center line of said V-shaped loop portion lying at an angle to the parallel extensions and in the direction of pull.

2. An attaching member for securing a tension means to the frame of an automobile, comprising a sheet metal member having the end portions thereof extending in spaced parallel planes for embracing the frame and having the intermediate portions converging in substantially straight lines to form a V-shaped loop for the reception of a tension anchoring means, the center line of said V-shaped loop being at an angle to the planes of said end portions, and in line with the direction of pull of the tension anchoring means.

3. An attaching device for securing an anchor chain to the box section frame of an automobile comprising a generally U-shaped strap metal member, the upper ends of its two legs including spaced substantially parallel portions formed to engage and be secured to each side of said box section frame member, the lower or bight portion of said member comprising substantially straight and downwardly converging portions spaced so that said chain will be tightly wedged between said converging straight portions under load and any tendency to spread said portions will tend to shorten said member.

4. An attaching device for securing automobiles in freight cars comprising, in combination, a generally U-shaped strap metal member, the upper ends of its two legs including spaced substantially parallel portions formed to engage and be secured to each side of the box section frame member of the automobile to be secured, an anchor or holddown chain having one end looped through the lower or bight portion of said member and said chain having its other end adapted to be secured with respect to the freight car floor, the lower or bight portion of said member comprising substantially straight and downwardly converging portions spaced apart at their nearest points a distance less than the minimum width of a link of said chain so that said chain will be tightly wedged between said converging straight portions under load on said chain and so that any tendency for the chain to spread said portions will tend to shorten said member.

5. An attaching device for securing an anchor chain to the box section frame of an automobile comprising a substantially U-shaped strap metal member, the upper ends of its two legs including spaced parallel portions adapted to closely engage each side of said box section frame, and the upper end of each leg having a hole, said holes being aligned to receive a single pivot bolt through said frame, the lower or bight portion of said member comprising substantially straight and downwardly converging portions for the reception and gripping of said chain, the minimum width between said converging portions being less than the greatest width of said chain whereby said chain is adapted to be tightly wedged between said converging straight portions under load and any tendency to spread said portions will tend to shorten said member.

BEN COLMAN.